UNITED STATES PATENT OFFICE.

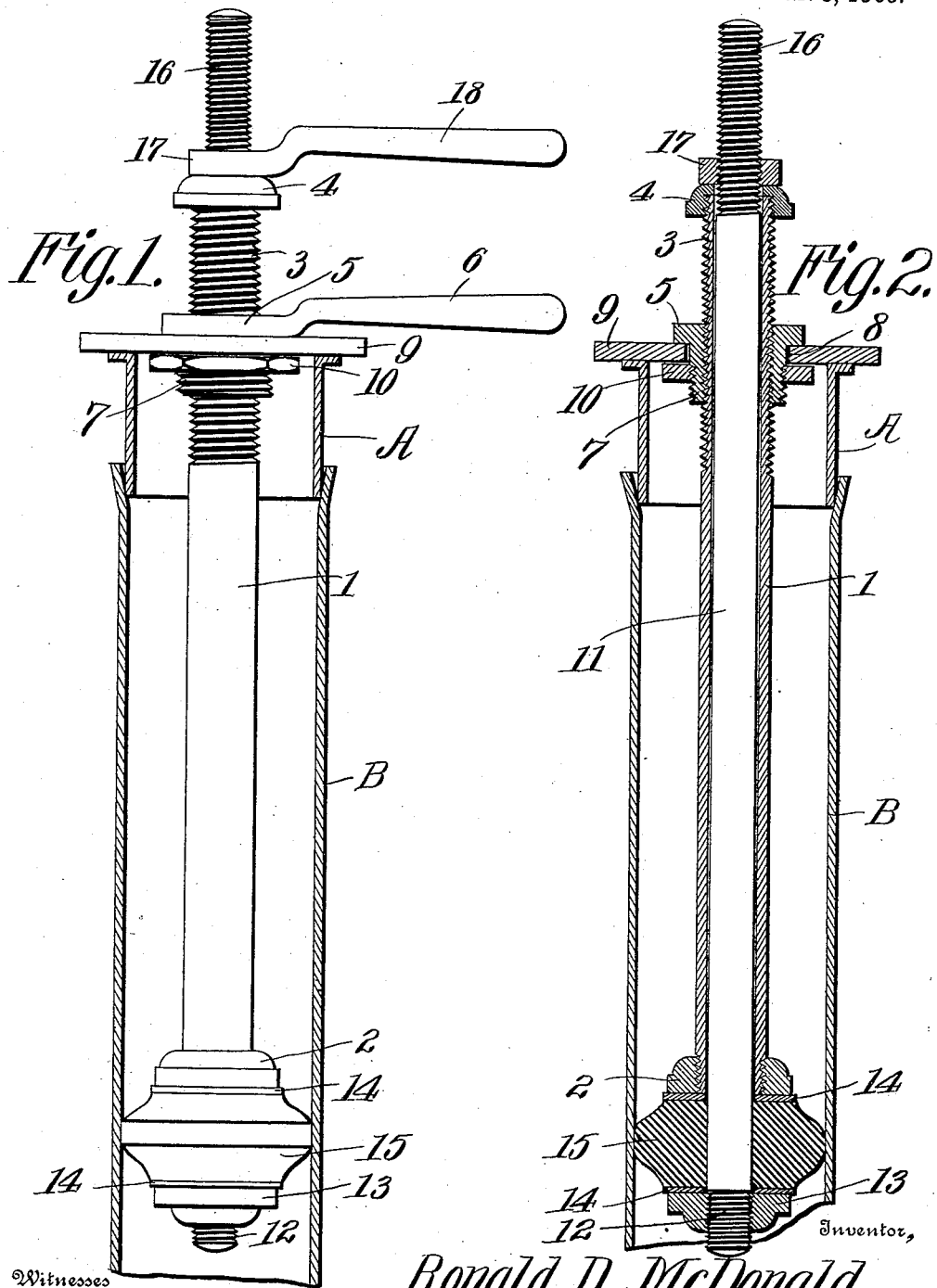

RONALD DONAL McDONALD, OF DE LAND, FLORIDA.

PLUMBER'S CLAMP.

No. 914,743.   Specification of Letters Patent.   Patented March 9, 1909.

Application filed July 10, 1908. Serial No. 442,954.

*To all whom it may concern:*

Be it known that I, RONALD DONAL MC-DONALD, a citizen of the United States, residing at De Land, in the county of Volusia and State of Florida, have invented a new and useful Plumber's Clamp, of which the following is a specification.

This invention relates to clamps for use by plumbers for holding ferrules or nipples in engagement with lead pipes while the joints are being wiped.

The object of the invention is to provide a tool of this character which can be readily secured to a lead pipe, said tool being adjustable to pipes of different sizes and having means whereby a ferrule or nipple can be forced into, and firmly held within the lead pipe so that the joint can be easily wiped without danger of the parts moving out of their relative positions.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the tool the same being shown in position within a pipe and ferrule. Fig. 2 is a longitudinal section through the tool.

Referring to the figures by characters of reference, 1 designates an elongated tube one end of which has a collar 2 secured thereto in any preferred manner while the other end of the tool is screw threaded for a considerable portion of its length as shown at 3 and provided with a collar 4 constituting a bearing as hereinafter set forth. Mounted upon the threaded portion of tube 1 is a nut 5 having a handle 6 extending therefrom and this nut is provided with a screw threaded boss 7 projecting loosely through an opening 8 in the center of a bearing plate 9. A nut 10 is mounted on the boss 7 and serves to prevent displacement of plate 9 relative to the boss.

Slidably mounted within the tube 1 is a rod 11 one end of which projects beyond the collar 2 and is screw threaded as at 12 so as to be detachably engaged by a collar 13. Washers 14 are arranged upon the adjoining faces of the collars 2 and 13 and constitute bearings for an expansible head 15 preferably formed of soft rubber and which extends around rod 11 between the two washers 14. The other end of the rod 11 projects beyond collar 4 and is screw threaded as shown at 16 and engaged by a nut 17 preferably provided with a handle 18.

When it is desired, for example, to secure a ferrule A to a lead pipe B the nut 17 is unscrewed so as to permit rod 11 to shift longitudinally within the tube 1 and permit the head 15 to contract. Said head is then inserted through the ferrule A and into pipe B a desired distance, after which nut 17 is screwed against collar 4 and upon the threaded portion 16 of rod 11. Collar 13 will therefore be drawn toward collar 2 and head 15 will be expanded radially so as to frictionally engage and clamp upon the inner surface of pipe B. Longitudinal movement of the tool relative to the pipe is thus prevented. Nut 5 is then rotated upon the threaded portion 3 of tube 1 so as to force the plate 9 against ferrule A. Said ferrule will therefore be forced into the pipe and can be firmly held while the joint is being wiped. After the ferrule has been secured in place the tool can be removed simply by unscrewing nut 17 so as to permit head 15 to return to normal position.

It will be seen that the device is very simple and compact in construction and by providing heads of different sizes the same can be used in connection with all sizes of lead pipes.

What is claimed is:

1. A clamp comprising an elastic radially expansible head, bearing members upon opposite portions of said head, telescopic members secured to the respective bearing members, suitable means coöperating with said telescopic members for shifting them relative to each other to compress the head and expand it radially, a bearing plate swiveled upon one of the telescopic members, and means for adjusting said bearing plate relative to the telescopic members.

2. A plumber's clamp comprising a relatively fixed tubular member, a bearing member upon one end of said member, an adjusting device threaded upon the tubular member, a bearing plate swiveled upon the adjusting device, a rod slidably mounted within the tubular member and extending beyond the ends thereof, means for adjusting said rod longitudinally within said member, a bearing carried by the rod and adjacent but spaced from the bearing member on the tubular member, and an elastic head upon the rod and between said bearing members and expansible radially by the movement of said bearing members toward each other.

In testimony that I claim the foregoing as my own, I have hereto affixed my signature in the presence of two witnesses.

RONALD DONAL McDONALD.

Witnesses:
 JAMES B. TAYLOR,
 E. T. GROSS.